United States Patent [19]
Ishitobi et al.

[11] Patent Number: 6,152,976
[45] Date of Patent: Nov. 28, 2000

[54] ABRASIVE COMPOSITION FOR DISC SUBSTRATE, AND PROCESS FOR POLISHING DISC SUBSTRATE

[75] Inventors: Ken Ishitobi; Norihiko Miyata, both of Shiojiri, Japan

[73] Assignee: Showa Denko Kabushiki Kaisha, Tokyo, Japan

[21] Appl. No.: 08/917,717

[22] Filed: Aug. 27, 1997

[30] Foreign Application Priority Data

Aug. 30, 1996 [JP] Japan ..................... 8-230775

[51] Int. Cl.$^7$ ............... C09K 3/14; C09G 1/02; C09G 1/04; B24B 1/00
[52] U.S. Cl. ............... 51/309; 106/3; 510/167; 510/397; 451/36
[58] Field of Search ............... 51/309; 106/3; 216/89; 252/79.1, 79.2; 510/167, 175, 395, 396, 397; 451/36

[56] References Cited

U.S. PATENT DOCUMENTS

| | | |
|---|---|---|
| 3,429,080 | 2/1969 | Lachapelle ............... 51/309 |
| 4,959,113 | 9/1990 | Roberts. |
| 5,697,992 | 12/1997 | Ueda et al. ............... 51/309 |
| 5,861,054 | 1/1999 | Miyashita et al. ............... 106/3 |

*Primary Examiner*—Michael Marcheschi
*Attorney, Agent, or Firm*—Sughrue, Mion, Zinn, Macpeak & Seas, PLLC

[57] ABSTRACT

An abrasive composition for polishing a substrate for a magnetic recording disc is described, which comprises finely divided titanium oxide particles, an abrasion promoter, an optional water-soluble oxidizing agent, and water. This abrasive composition is used for polishing a substrate for a magnetic recording disc by a process wherein the substrate is polished with a pad while the abrasive composition is supplied between the substrate and the pad, and at least one of the pad and the substrate is rotated. The contents of the finely divided titanium oxide particles, the abrasion promoter and the optional water-soluble oxidizing agent are 2–20 wt. %, 1–20 wt. % and up to 10 wt. %, respectively, based on the weight of the abrasive composition as used for polishing the substrate.

16 Claims, No Drawings

ABRASIVE COMPOSITION FOR DISC SUBSTRATE, AND PROCESS FOR POLISHING DISC SUBSTRATE

BACKGROUND OF THE INVENTION (1) Field of the Invention

This invention relates to an abrasive composition for polishing a disc substrate for a magnetic recording medium, and a process for polishing the disc substrate. More particularly, it relates to an abrasive composition used for polishing a disc substrate for a magnetic recording medium having minimized surface irregularities, above which a magnetic head is capable of floating at a low flying height; and to a process for polishing the disc substrate.

(2) Description of the Related Art

Magnetic recording discs, i.e., memory hard discs, are widely used as memory means giving quick access to information as external memories of computers and word processors. A typical example of the magnetic recording discs is made by a process wherein a substrate composed of an aluminum alloy disc blank with a nickel-phosphorus (NiP) surface coating, formed by electroless plating, is surface-polished, and then, a chromium underlayer, a cobalt alloy magnetic film and a carbon protective film are formed in this turn on the polished NiP surface by a sputter deposition.

If the substrate has irregularities on the polished surface which have a height larger than the flying height of a magnetic read/write head, when the magnetic head floating above the magnetic disc flies at a high speed, the head impinges upon the irregularities with the result of damage of the magnetic head. If the substrate for the magnetic recording disc has polish marks or irregularities, the marks or irregularities develop on the surfaces of the chromium underlayer, the cobalt alloy magnetic film and the carbon protective film in turn, and consequently a functional defect is caused on the magnetic recording disc. Thus it is necessary to polish the substrate surface with a high precision for giving a magnetic recording disc having a smooth surface.

A wide variety of abrasive compositions and polishing methods have heretofore been proposed for removing or minimizing irregularities on the surface of substrate for magnetic recording discs and providing a smooth substrate surface with neither polish marks nor irregularities. As examples of the proposed abrasive compositions or polishing methods, there can be mentioned (1) a two-stage polishing method using an abrasive composition comprising aluminum oxide having incorporated therewith (i) an oxidizing agent such as sodium hypochlorite, or colloidal aluminum, and (ii) cerium dioxide (Japanese Unexamined Patent Publication [hereinafter abbreviated to "JP-A"] 60-108489), (2) an abrasive composition comprising alumina having incorporated therein sulfamic acid or phosphoric acid (JP-A 61-291674), (3) an abrasive composition comprising alumina having incorporated therein aluminum nitrate (JP-A 62-25187), (4) an abrasive composition comprising alumina having incorporated therein boehmite (JP-A 1-188264), (5) an abrasive composition comprising alumina having incorporated therein a metal salt and boehmite (JP-A 1-205973), (6) an abrasive composition comprising alumina having incorporated therein a metal nitrite salt (JP-A 2-158682), (7) an abrasive composition comprising alumina having incorporated therein boehmite and an ammonium salt of an organic or inorganic acid (JP-A 2-158683), (8) a polishing method using an abrasive composition comprising an alumina slurry having pre-treated with an ultrasonic filter (JP-A 3-106984), (9) an abrasive composition comprising alumina having incorporated therein boehmite and a water-soluble peroxide (JP-A 3-115383), (10) an abrasive composition comprising alumina having incorporated therein an amino acid (JP-A 4-108887), (11) an abrasive composition comprising alumina having incorporated therein (i) aluminum sulfate and/or aluminum chloride, and (ii) at least one compound selected from a peroxide, nitric acid, a nitrate salt, a nitrite salt and an aromatic nitro compound (JP-A 4-275387), (12) an abrasive composition comprising alumina having incorporated therein a chelate compound, boehmite and an aluminum salt (JP-A 4-363385), (13) an abrasive composition comprising alumina having incorporated therein boehmite which has been obtained by heat-treating rectangular primary particles of gibbsite (JP-A 5-271647), and (14) an abrasive composition comprising colloidal silica particles and a chemical etching agent (JP-A 7-240025).

In the above-mentioned proposals (1) through (13), finely divided alumina or other aluminum compounds having an average particle diameter of about 1 $\mu$m are used as an abrasive, and thus, the substrate surfaces polished by these abrasive compositions exhibit a smoothness of an extent such that a practically acceptable flying height can be ensured. However, in recent years, a lower flying height is eagerly desired for allowing recording density to be increased, and it is difficult or impossible by these proposals to provide a perfect substrate surface with a high precision on which the desired lower flying height can be achieved.

In the above-mentioned proposal (14), colloidal silica particles having an average particle diameter of several-tens nanometer are used as an adhesive, a polished substrate surface with a high precision can be obtained. However, the rate of polishing is low and thus the productivity is low, and, when polishing is conducted for a long time, the circumferential edge part of a substrate surface is undesirably abraded in excess.

It is eagerly desired for an abrasive composition used for polishing an aluminum magnetic disc substrate for a high-density recording medium to produce a disc surface with a high precision such that a magnetic head is capable of floating at a low flying height. As regards the precision of disc surface, the magnitude of average surface roughness (Ra) and the presence of surface irregularities are important, and it is more important whether errors occur or do not occur when a read/write test is conducted as hereinafter described. It has recently been recognized that these errors are due to polish marks or polish pits. Therefore, it is eagerly desired to minimize or eliminate the occurrence of polish marks and polish pits.

SUMMARY OF THE INVENTION

A primary object of the present invention is to provide an abrasive composition used for polishing a disc substrate for a magnetic recording medium to give a disc substrate having a reduced surface roughness, minimized surface irregularities and polish marks, and providing a magnetic recording medium exhibiting a high recording density.

Another object of the present invention is to provide a process for polishing a disc substrate for a magnetic recording medium by which the polishing can be effected at a reasonable rate and which results in a polished disc substrate giving a magnetic recording medium exhibiting a high recording density.

In one aspect of the present invention, there is provided an abrasive composition for polishing a disc substrate for a magnetic recording medium, comprising finely divided titanium oxide particles, an abrasion promoter and water.

In another aspect of the present invention, there is provided an improvement in a process for polishing a disc substrate for a magnetic recording medium wherein the disc substrate is polished with a pad while an abrasive composition is supplied between the substrate and the pad, and at least one of the pad and the substrate is rotated, the improvement comprising using an abrasive composition comprising finely divided titanium oxide particles, an abrasion promoter and water.

Preferably, the finely divided titanium oxide particles have an average diameter of 0.1 to 1.0 μm, and the abrasion promoter is an aluminum salt, and further, a water-soluble oxidizing agent is preferably incorporated in the abrasive composition.

DESCRIPTION OF THE PREFERRED EMBODIMENTS

The abrasive composition of the present invention is used especially for polishing a disc substrate to give a magnetic recording medium, by which a high magnetic recording density usually of at least 500 Mbit/inch$^2$ can be attained, and which is represented by a magnetic recording disc for a magnetic recording head utilizing a magnetic resistance (MR) effect. But, the abrasive composition can also be used for polishing other disc substrates to give magnetic recording media with a high reliability.

The abrasive composition of the present invention contains finely divided particles of titanium oxide as an abrasive. The titanium oxide particles are usually in the form of secondary particles, which are agglomerates of primary particles. The titanium oxide particles preferably have a size such that the secondary particles have an average particle diameter of 0.1 to 1.0 μm.

The abrasion rate of finely divided titanium oxide particles greatly varies depending upon the particular size of secondary particles thereof. The larger the size of secondary particles, the higher the abrasion rate. However, as the size of secondary particles increases, polish marks tend to occur on the polished surface and consequently missing pulse errors are occasionally caused. Therefore, to prevent or minimize the occurrence of polish marks and to provide a hard disc substrate for a magnetic recording medium above which a magnetic head is capable of floating at a low flying height, the average diameter of secondary particles is preferably not larger than 1.0 μm. To enhance the abrasion rate and minimize the undesirably excessive abrasion at the circumferential edge part of a substrate surface, the average diameter of secondary particles is preferably at least 0.1 μm.

As the size of primary particles increases, polish marks tend to occur on the polished surface. Therefore, to prevent or minimize the occurrence of polish marks and enhance the abrasion rate, the average diameter of primary particles is preferably in the range of 0.01 to 0.6 μm as measured as an average value of long diameter and short diameter.

If the particle size distribution of titanium oxide is broad, polish marks tend to occur. Therefore, the particle size distribution is preferably sharp, and it is especially preferable that the ratio of $D_{90}/D_{10}$ is not larger than 3.7, more preferably not larger than 3.5, wherein $D_{90}$ is a diameter at a cumulative distribution of 90% by weight and $D_{10}$ is a diameter at a cumulative distribution of 10% by weight, respectively, in the particle size distribution of secondary particles.

The crystalline structure of titanium oxide is not particularly limited, but anatase titanium oxide and rutile titanium oxide are preferable as compared with brookite titanium oxide. Rutile titanium oxide has smaller crystalline cells than those of anatase titanium oxide. Therefore, rutile titanium oxide is dense and has a high hardness, and thus, exhibits a high abrading action, but polish marks easily occur, as compared with anatase titanium dioxide. Thus, preferably the titanium oxide has a mixed crystalline structure such that the proportion of rutile titanium oxide is in the range of 10 to 80% by weight based on the total titanium oxide.

The method of preparing the finely divided titanium oxide particles is not particularly limited. But, a sulfuric acid method and a chlorine method are usually employed. In the sulfuric acid method, ilmenite or titanium slag is treated with sulfuric acid, followed by the steps of dissolution, hydrolysis and then calcination. In the chlorine method, rutile is red-heated to be thereby dehydrated, and, is then placed in a chlorination furnace into which a chlorine gas is blown, where gaseous titanium chloride is produced; and the titanium chloride is fractionated to give titanium tetrachloride, which is then directly thermally decomposed into titanium oxide.

The abrasive composition of the present invention has incorporated therein an abrasion promoter to impart a chemical abrading function to the composition, and enhance the abrading efficiency. As specific examples of the abrasion promoter, there can be mentioned aluminum nitrate (Al(NO$_3$)$_3$), aluminum sulfate (Al$_2$(SO$_4$)$_3$), aluminum oxalate (Al$_2$(C$_2$O$_4$)$_3$), ferric nitrate (Fe(NO$_3$)$_3$), aluminum lactate (Al(C$_3$H$_5$O$_3$)$_3$), gluconic acid (C$_6$H$_{12}$O$_7$) and malic acid (C$_4$H$_6$O$_5$). Of these, aluminum salts of acids are preferable, and aluminum nitrate is most preferable.

The abrasion promoter exhibits a chemical function such as corrosive action to the substrate, and the abrading efficiency can be greatly enhanced by the combination of a physical abrading action of titanium oxide particles with the chemical function of the abrasion promoter.

If a water-soluble oxidizing agent is further incorporated in the abrasive composition, the abrading action is more enhanced. As specific examples of the water-soluble oxidizing agent, there can be mentioned hydrogen peroxide (H$_2$O$_2$), nitric acid, potassium permanganate (KMnO$_4$), perchloric acid (HClO$_4$), sodium perchlorate (NaClO$_4$) and sodium hypochlorite (NaClO).

Auxiliary ingredients can be incorporated in the aqueous abrasive composition comprising the finely divided titanium oxide particles, the abrasion promoter, water and the optional water-soluble oxidizing agent. The auxiliary ingredients include, for example, a surface active agent, a preservative and a pH adjuster such as an alkali or an acid. For example, when the abrasive composition contains an acid salt of aluminum such as aluminum nitrate as an abrasion promoter, pH of the abrasive composition is preferably adjusted to a value of 2 to 5. If the pH value is lower than 2, problems arise in corrosion of a polishing apparatus and working properties. If the pH value exceeds 5, the abrasion efficiency is reduced.

The contents of the above-mentioned ingredients in the aqueous abrasive composition of the present invention as used for polishing a substrate for a magnetic recording disc are as follows. It is convenient that, when the aqueous abrasive composition is as-made and in storage, the contents of the respective ingredients are high (i.e., the abrasive composition is concentrated), and, when it is applied for polishing the substrate, the abrasive composition is diluted to the desired concentration, explained below.

The content of the finely divided titanium oxide particles is preferably in the range of 2 to 20% by weight based on the total weight of the abrasive composition as used for polishing. If the titanium oxide content is smaller than 2% by weight, the rate of abrasion is drastically reduced and a long time is required for completion of polishing. In contrast, as the titanium oxide content is increased, the abrasion rate is enhanced. But, when the titanium oxide content exceeds 15% by weight, enhancement of the abrasion rate becomes minor. From a practical viewpoint, the maximum content of titanium oxide is preferably about 20% by weight.

The content of the abrasion promoter is preferably in the range of 1 to 20% by weight, more preferably 2 to 15% by weight, based on the weight of the abrasive composition as used for polishing. When the content of the abrasion promoter is too low, the abrasion rate is lowered, a long time is required for completion of polishing, and the circumferential edge part of a substrate surface is undesirably abraded in excess. As the content of the abrasion promoter is increased, the abrasion rate increases until the content reaches about 15% by weight, but, when the content exceeds about 15% by weight, it increases only to a negligible extent. Any baneful influence is not exerted on the polished surface when the content exceeds about 15% by weight, but, the upper limit is 20% by weight from an economical viewpoint.

For enhancement of the abrading action, the content of the optional water-soluble oxidizing agent is preferably not larger than 10% by weight based on the weight of the abrasive composition as used for polishing. Even if the content of the oxidizing agent exceeds 10% by weight, the enhancement of abrading action is not enhanced.

The abrasive composition of the present invention is prepared in a conventional manner wherein finely divided titanium oxide particles are suspended in water and then an abrasion promoter and an optional water-soluble oxidizing agent are incorporated in the aqueous suspension.

The disc substrate for a magnetic recording medium to be polished with the aqueous abrasive composition of the present invention is not particularly limited. However, the abrasive composition of the present invention is advantageously used for polishing substrates made of a disc blank of aluminum or an aluminum alloy such as an aluminum-magnesium alloy. As preferable examples of the substrates, there can be mentioned aluminum or aluminum alloy disc blanks, which have been plated with nickel-phosphorus (NiP), nickel-copper (NiCu) or cobalt-phosphorus (CoP), or which have been subjected to anodic oxidation.

The polishing of a disc substrate can be effected by a process wherein the substrate is polished with a pad while an aqueous slurry of the abrasive composition of the present invention is supplied between the substrate and the pad, and at least one of the pad and the substrate is rotated.

The substrate polished with the abrasive composition of the present invention have extremely minimized surface irregularities. The surface roughness (Ra) is about 3 to 5 angstroms and thus the smoothness is excellent.

The invention will now be described by the following examples wherein % is by weight unless otherwise specified.

Properties of titanium oxide particles, polished substrates and magnetic recording discs were evaluated by the following methods.

(1) Average particle diameter

The average particle diameter of primary particles was measured as an average value of long diameter and short diameter by a scanning electron microscope (SEM) photograph.

The average particle diameter of secondary particles was measured by a controlled reference method of dynamic light scattering using "Microtrac UPA150" supplied by Honeywell Inc.

(2) Rate of abrasion

After completion of polishing, a polished disc substrate was washed with water, dried and then the weight reduction due to polishing was measured. The reduction of thickness ($\mu$m) of the substrate was calculated from the weight reduction, and the rate of abrasion was expressed by the reduction of substrate thickness ($\mu$m) per minute.

(3) Surface roughness (Ra) of substrate

The surface roughness (Ra) of a polished substrate was measured by a Talystep and a Talydata 2000 (supplied by Rank Taylor Hobson Co.).

(4) Missing-pulse errors

A magnetic recording disc was tested by a glide certifier tester RQ-3000, supplied by Hitachi Electronics Engineering Co., under the following testing conditions.

Track width: 3 $\mu$m

Recording density: flux variation 70,000 per inch

Flying height of head: 2.0 micro-inch (50.8 nm)

Number of revolution: 4,500 rpm

Slice level: 65%

Missing-pulses smaller than a slice level of 65%, i.e., missing-pulses wherein the ratio of the output waveform to the input waveform was smaller than 65%, were rated as missing-pulse errors. The evaluation results were expressed by the number of missing-pulse errors per disc.

(5) Polish marks and pits on substrate

The maximum depth of polish marks on a polished substrate and the maximum depth of surface defects (i.e., pits), at which missing-pulse errors did not occur, namely, the ratio of the output waveform to the input waveform was smaller than 65%, were measured by using an optical irregularity-testing apparatus (three-dimensional non-constant surface profiler "Topo-3D" supplied by WYKO Co.).

The evaluation results of polish marks and pits were expressed by the following two ratings:

A: acceptable; the depth was not larger than 15 nm

B: unacceptable; the depth was larger than 15 nm.

EXAMPLES 1–20 and COMPARATIVE EXAMPLES 1, 2

Preparation of Abrasives

Finely divided titanium oxide particles used as abrasive in Examples 1–20 were prepared as follows.

Each of two kinds of high-purity titanium oxide particles ("Super-titania F-1" supplied by Showa Titania K.K., average primary particle diameter=0.1 $\mu$m, ratio of rutile=50% by weight; and "Super-titania F-2" supplied by Showa Titania K.K., average primary particle diameter =0.06 $\mu$m, ratio of rutile=16% by weight) was allowed to sediment whereby the particles were classified to give finely divided titanium oxide particles having an average secondary particle diameter shown in Table 1. The particles had a particle size distribution such that the ratio of $D_{90}/D_{10}$ was 3.4 wherein $D_{90}$ and $D_{10}$ are diameters at a cumulative distribution of 90% by weight and 10% by weight, respectively, in the particle size distribution of secondary particles.

The titanium oxide powder was disintegrated and dispersed in water by using a high-speed homogenizer, and then was classified by sedimentation. The aqueous titanium oxide slurry, collected from the homogenizer, was adjusted to a predetermined concentration. The aqueous titanium oxide slurry had a pH in the range of 2.3 (Example 9) and 4.1 (Example 5), and was very stable.

For comparison, finely divided -alumina particles having an average secondary particle diameter of 0.4 m ("AL- 160SG-1" supplied by Showa Denko K.K.) and colloidal silica having an average particle diameter of 0.06 m ("NS-2" supplied by Nissan Chem. Co.) were used as abrasive, respectively, in Comparative Examples 1 and 2.

Aqueous abrasive compositions were prepared by incorporating a polishing promoter and an optional water-soluble oxidizing agent in the aqueous titanium oxide slurry according to the formulation shown in Table 1.

After completion of polishing and washing, a chromium layer with a thickness of 100 nm was formed on the polished substrate, a $Co_{86}Cr_{12}Ta_2$ magnetic layer having a thickness of 25 nm was formed thereon, and a protecting carbon layer was formed on the magnetic layer, by using a direct current sputtering apparatus. Finally, a lubricating coating composed of a perfluoro-polyether lubricating agent having a thickness of 2 nm was formed on the carbon layer to give a magnetic recording disc.

TABLE 1

| Example *1 | Abrasive Kind *2 | Primary particle diameter ($\mu$m) | Secondary particle diameter (wt. %) | Amount (wt. %) | Promoter Kind *3 | Amount (wt. %) | Oxidizing Agent Kind *4 | Amount (wt. %) |
|---|---|---|---|---|---|---|---|---|
| Ex. 1 | $TiO_2$ | 0.1 | 0.3 | 1 | $Al(NO_3)_3$ | 5.0 | — | — |
| Ex. 2 | " | 0.1 | 0.3 | 5 | " | 5.0 | — | — |
| Ex. 3 | " | 0.1 | 0.3 | 10 | " | 5.0 | — | — |
| Ex. 4 | " | 0.1 | 0.3 | 20 | " | 5.0 | — | — |
| Ex. 5 | " | 0.1 | 0.3 | 5 | " | 0.5 | — | — |
| Ex. 6 | " | 0.1 | 0.3 | 5 | " | 1.0 | — | — |
| Ex. 7 | " | 0.1 | 0.3 | 5 | " | 2.0 | — | — |
| Ex. 8 | " | 0.1 | 0.3 | 5 | " | 5.0 | — | — |
| Ex. 9 | " | 0.1 | 0.3 | 5 | " | 10.0 | — | — |
| Ex. 10 | " | 0.1 | 0.3 | 5 | " | 2.0 | $H_2O_2$ | 1.0 |
| Ex. 11 | " | 0.1 | 0.3 | 5 | " | 2.0 | $HNO_3$ | 0.2 |
| Ex. 12 | " | 0.1 | 0.3 | 5 | $Al_2(SO_4)_3$ | 2.0 | — | — |
| Ex. 13 | " | 0.1 | 0.3 | 5 | $Al_2(C_2O_4)_3$ | 2.0 | — | — |
| Ex. 14 | " | 0.1 | 0.3 | 5 | $Fe(NO_3)_3$ | 2.0 | — | — |
| Ex. 15 | " | 0.1 | 0.3 | 5 | Al lactate | 2.0 | — | — |
| Ex. 16 | " | 0.1 | 0.3 | 5 | Gluconic acid | 1.0 | — | — |
| Ex. 17 | " | 0.1 | 0.3 | 5 | Malic acid | 1.0 | — | — |
| Ex. 18 | " | 0.1 | 0.5 | 5 | $Al(NO_3)_3$ | 5.0 | — | — |
| Ex. 19 | " | 0.1 | 1.0 | 5 | " | 5.0 | — | — |
| Ex. 20 | " | 0.06 | 0.3 | 5 | " | 5.0 | — | — |
| C.E. 1 | $Al_2O_3$ | — | 0.4 | 7 | " | 2.0 | — | — |
| C.E. 2 | Col. silica | — | 0.06 | 10 | " | 5.0 | — | — |

*1 Ex = Example
C.E. = Comparative Example
*2 Abrasive: $TiO_2$ = finely divided titanium oxide particles
$Al_2O_3$ = finely divided α-alumina particles
Col. silica = colloidal silica
*3 Promoter: $Al(NO_3)_3$ = aluminum nitrate
$Al_2(SO_4)_3$ = aluminum sulfate
$Al_2(C_2O_4)_3$ = aluminum oxalate
$Fe(NO_3)_3$ = ferric nitrate
Al lactate = aluminum lactate
*4 Water-soluble oxidizing agent: $H_2O_2$ = hydrogen peroxide
$HNO_3$ = nitric acid Polishing Test An aluminum alloy disc blank with a nickel-phosphorus (NiP) coating formed by electroless plating, having a diameter of 3.5 inches (95 mm) and a thickness of 0.8 mm was used as a substrate for a magnetic recording disc.

The substrate was polished under the following conditions.
  Polishing machine: 4-way double-sided polishing machine ("SFDL-98-PP" supplied by Speedfam Co.) with a surface plate having a diameter of 640 mm.
  Polishing pad: Suede-type ("Polytex DG" supplied by Rodel, Inc.)
  Number of revolution of lower surface plate: 60 rpm
  Feed rate of crude aqueous abrasive composition: 50 ml/min
  Polishing time: 5 minutes
  Working pressure: 50 g/cm$^2$ The evaluation results of abrasion rate of the substrate, surface roughness of the polished substrate, polish marks and pits on the polished substrate, and number of missing-pulse errors on the magnetic recording disc are shown in Table 2.

TABLE 2

| | Abrasion rate ($\mu$m/min) | Surface roughness Ra (angstrom) | Polish marks | Surface flaw (pits) | Missing-pulse errors ( /disc) |
|---|---|---|---|---|---|
| Ex. 1 | 0.14 | 4 | A | A | 0 |
| Ex. 2 | 0.36 | 5 | A | A | 0 |
| Ex. 3 | 0.39 | 6 | A | A | 0 |
| Ex. 4 | 0.40 | 6 | A | A | 0 |
| Ex. 5 | 0.20 | 6 | A | B | 0 |
| Ex. 6 | 0.28 | 5 | A | A | 0 |
| Ex. 7 | 0.32 | 5 | A | A | 0 |

TABLE 2-continued

|  | Abrasion rate (μm/min) | Surface roughness Ra (angstrom) | Polish marks | Surface flaw (pits) | Missing-pulse errors (/disc) |
| --- | --- | --- | --- | --- | --- |
| Ex. 8 | 0.36 | 5 | A | A | 0 |
| Ex. 9 | 0.39 | 5 | A | A | 0 |
| Ex. 10 | 0.36 | 5 | A | A | 0 |
| Ex. 11 | 0.35 | 5 | A | A | 0 |
| Ex. 12 | 0.21 | 6 | A | A | 0 |
| Ex. 13 | 0.24 | 6 | A | A | 0 |
| Ex. 14 | 0.30 | 5 | A | A | 0 |
| Ex. 15 | 0.28 | 5 | A | A | 0 |
| Ex. 16 | 0.27 | 5 | A | A | 0 |
| Ex. 17 | 0.26 | 5 | A | A | 0 |
| Ex. 18 | 0.40 | 8 | A | A | 0 |
| Ex. 19 | 0.50 | 20 | B | A | 20 |
| Ex. 20 | 0.21 | 4 | A | A | 0 |
| C.E. 1 | 0.60 | 15 | B | B | 60 |
| C.E. 2 | 0.12 | 2 | A | A | 0 |

As seen from Table 1 and Table 2, when a disc substrate is polished by using the abrasive composition of the present invention, a polished surface having a reduced surface roughness and minimized polish marks and pits can be obtained at a high polishing rate, and, the resulting magnetic recording disc is characterized in that a magnetic head is capable of floating at a low flying height above the magnetic recording disc, and the magnetic recording disc exhibits a high recording density.

The magnetic recording disc made from a substrate polished with the abrasive composition of the present invention exhibits a high magnetic recording density usually of at least 500 Mbits/inch$^2$. But, the abrasive composition can also be used for polishing other disc substrates to give a magnetic recording medium with a high reliability.

What is claimed is:

1. An abrasive composition for polishing a substrate for a magnetic recording disc, which comprises finely divided titanium oxide particles, an abrasion promoter and water; said finely divided titanium oxide particles comprising secondary particles having an average particle diameter of 0.1 to 1.0 μm, and a particle size distribution such that the diameter ($D_{90}$) at a cumulative distribution of 90% by weight in the particle size distribution of the secondary particles and the diameter ($D_{10}$) at a cumulative distribution of 10% by weight in the particle size distribution of the secondary particles satisfy the formula: $D_{90}/D_{10} \leq 3.7$.

2. The abrasive composition according to claim 1 wherein the secondary particles are agglomerates of primary particles having an average particle diameter of 0.01 to 0.6 μm.

3. The abrasive composition according to claim 1 wherein the abrasion promoter is an aluminum salt of an acid.

4. The abrasive composition according to claim 3 wherein the aluminum salt is aluminum nitrate.

5. The abrasive composition according to claim 4 wherein the abrasive composition has a pH value of 2 to 5.

6. The abrasive composition according to claim 1 wherein the content of the finely divided titanium oxide particles and the content of the abrasion promoter are 2 to 20% by weight and 1 to 20% by weight, respectively, based on the weight of the abrasive composition as used for polishing a substrate for a magnetic recording disc.

7. The abrasive composition according to claim 1 which further comprises a water-soluble oxidizing agent.

8. The abrasive composition according to claim 7 wherein the water-soluble oxidizing agent is selected from the group consisting of hydrogen peroxide, nitric acid, potassium permanganate, perchloric acid, sodium perchlorate and sodium hypochlorite.

9. The abrasive composition according to claim 7 wherein the content of the water-soluble oxidizing agent is not larger than 10% by weight based on the weight of the abrasive composition as used for polishing a substrate for a magnetic recording disc.

10. An improvement in a process for polishing a substrate for a magnetic recording disc wherein the substrate is polished with a pad while an abrasive composition is supplied between the substrate and the pad, and at least one of the pad and the substrate is rotated, the improvement comprising using an abrasive composition according to claim 1.

11. The process according to claim 10 wherein the finely divided titanium oxide particles has a size such that the primary particles have an average particle diameter in the range of 0.01 to 0.6 μm.

12. The process according to claim 10 wherein the abrasion promoter is an aluminum salt of an acid.

13. The process according to claim 10 wherein the content of the finely divided titanium oxide particles and the content of the abrasion promoter are 2 to 20% by weight and 1 to 20% by weight, respectively, based on the weight of the abrasive composition as used for polishing a substrate for a magnetic recording disc.

14. The process according to claim 10 wherein the abrasive composition further comprises a water-soluble oxidizing agent.

15. The process according to claim 14 wherein the content of the water-soluble oxidizing agent is not larger than 10% by weight based on the weight of the abrasive composition as used for polishing a substrate for a magnetic recording disc.

16. The process according to claim 10 wherein the substrate for a magnetic recording disc is a disc blank made of aluminum or an aluminum alloy, which has been plated with nickel-phosphorus, nickel-copper or cobalt-phosphorus, or which has been subjected to anodic oxidation.

* * * * *